United States Patent [19]

Barton

[11] Patent Number: 5,313,287
[45] Date of Patent: May 17, 1994

[54] IMPOSED WEIGHT MATRIX ERROR DIFFUSION HALFTONING OF IMAGE DATA

[75] Inventor: David C. Barton, Vancouver, Wash.
[73] Assignee: Hewlett-Packard Company, Palo Alto, Calif.
[21] Appl. No.: 55,628
[22] Filed: Apr. 30, 1993
[51] Int. Cl.⁵ .............................................. G03F 3/08
[52] U.S. Cl. .................................. 358/458; 358/455; 358/456; 358/457
[58] Field of Search ............... 358/448, 445, 447, 455, 358/456, 458, 459, 457, 486, 474, 494, 497

[56] References Cited
U.S. PATENT DOCUMENTS

4,962,464 10/1990 Henzi .................................. 358/474
5,210,602 5/1993 Mintzer ................................. 358/80
5,243,443 9/1993 Eschbach ............................ 358/455

Primary Examiner—Edward L. Coles, Sr.
Assistant Examiner—John Ning

[57] ABSTRACT

Methods are disclosed for improving output image quality and reducing processing time in digital halftoning systems. The direction of processing each scan line of a source image is selected with blue noise, rather than the tradional raster scan sequence, to reduce directional and start-up anomalies. Source image pixel gray values are adjusted by means of imposed matrices, prior to error diffusion, in order to minimize distracting patterns and other anomalies in the output image. Error diffusion threshold values are modulated with blue noise, and the average threshold value reduced to reduce start-up delay. Finally, error terms in the error diffusion process are diffused according to a new three-weight filter. The three-weight filter substantially reduces error diffusion processing time, without sacrificing output image quality when used in combination with the modulated error diffusion threshold values.

20 Claims, 4 Drawing Sheets

IMPOSED WEIGHT MATRIX ERROR DIFFUSION HALFTONING OF IMAGE DATA

FIELD OF THE INVENTION

This invention relates to the field of digital halftoning and, in particular, to methods for improving processing speed and output image quality in digital halftoning systems.

BACKGROUND OF THE INVENTION

Digital image data must be transformed or preprocessed so that computer display terminals with various gray level capacities, laser printers, dot matrix printers, ink jet printers, etc, all having various resolutions and aspect ratios, will all render an image represented by the image data in a similar way. A preprocessor associated with or configured for each such device transforms the digital data to a form tailored to the characteristics of that particular device.

Digital Halftoning is a key component of such a preprocessor. This term refers to any process that creates the illusion of continuous-tone images from careful arrangement of binary picture elements, such as ink drops in the case of ink jet printers. The process is also called spatial dithering.

One of the problems with known halftoning techniques is transient behavior near edges or boundaries. This also may be referred to as "start-up delay," and is evident where the first portion of an image to be processed has a very low gray value. Since several of the initial pixels have gray values lower than the error diffusion threshold value, no dots are fired for a time. A first dot will be fired after the accumulated error exceeds the threshold value. The need remains for a halftoning technique that minimizes or eliminates start-up delay transients.

Another common problem with known halftoning techniques is directional hysteresis due to the raster order of processing. This is particularly apparent in very light and very dark patterns. The normal (unidirectional) raster processing order also exacerbates start-up delay anomalies. A "serpentine" or boustrophedonic raster has been suggested to break-up the directionality of a normal raster without the expense of a full two-dimensional buffer. Since neighborhood operations generally buffer image data in full lines, a serpentine raster process does not require increased memory over a normal raster. Nonetheless, a serpentine raster order can itself introduce visible patterns or anomalies which would not otherwise be present in the rendered image. The need remains therefore for reducing or eliminating anomalies that result from the conventional raster ordered processing.

Known error diffusion techniques are computationally intensive and therefore time consuming. For example, even the relatively simply Floyd and Steinberg technique requires, for each pixel, calculation of four separate error terms, weighted according to the filter, and then adding those error terms to the four corresponding neighboring pixels. Other error diffusion filters require processing a greater number of terms, for example, the twelve error terms required by the Stucki filter. The need remains, therefore, for error diffusion in a manner that creates a high quality output image while minimizing processing time.

Another problem with known halftoning methods are the unsightly patterns, clusters and "worm" anomalies that appear in a rendered image in areas where the source image is of constant gray value or nearly so. While some patterns are unobtrusive and an element of subjective judgment is involved in any case, the need remains nonetheless for improved output image quality in halftoned systems.

SUMMARY OF THE INVENTION

In view of the foregoing background discussion, it is an object of the present invention to halftone a source image in a manner that minimizes or eliminates start-up delay transients in the output image.

Another object of the invention is reducing or eliminating anomalies that result from the conventional raster ordered halftoning of a digital image.

Another object is to improve halftoned output image quality by reducing or eliminating obtrusive patterns and anomalies.

A further object is to reduce error diffusion processing time without compromising output image quality.

One aspect of the invention is a method of halftoning a digital image. A digital source file or input image is formed of a rectangular array of scan lines of pixels, each pixel having a gray value. The method includes, for each scan line, selecting a processing direction such that the selected processing direction varies from each scan line to the next according to a blue noise function. This has the advantage of reducing directional and start-up delay artifacts in the output image. Preferably, the blue noise function for selecting scan line processing direction has a minimum frequency of approximately one direction change per three scan lines.

Another aspect of the invention is an imposed matrix method of adjusting pixel data prior to error diffusion in order to improve halftoning output image quality. This adjustment is made for each pixel on a local (point) basis. To make the adjustments, an imposed matrix is designed for each possible image pixel gray value. The imposed matrices each comprise a predetermined pattern of cells, for example a rectangular array, each cell having one of a predetermined pair of gray values. Thus, it is convenient to represent each matrix with a bitmap, and provide a lookup table having an entry for each matrix that indicated the actual values to be substituted for ones and zeros, respectively, in the bitmap. The imposed matrices are completely unrestricted as to dimension, aspect ratio, and "order" in that each matrix is independent of the others.

Each imposed matrix is arranged to have an average gray value approximately equal to the corresponding pixel gray value. According to the present method, each pixel is processed by first, reading the image data to determine the pixel gray value; second, selecting an imposed matrix that corresponds to the pixel gray value; third, logically tiling the source image with the selected imposed matrix to determine a location in the matrix that corresponds to the current pixel location; and finally, adjusting the image pixel gray value to a corresponding new gray value defined by the corresponding location in the selected imposed matrix. Then the adjusted pixel is halftoned, i.e. quantized and error diffused.

Another aspect of the invention is to modulate error diffusion threshold values. The modulated threshold values vary from one pixel to the next according to a blue noise function. I have also found it useful, to reduce start-up delay, to select an average threshold value less than approximately fifty percent. In the preferred embodiment of an ink jet printing system, the error diffusion threshold values vary within a range of approximately seven to 20 percent, and average about 14 percent. The blue noise function has a minimum frequency such no three consecutive threshold values are above or below the average value.

Another feature of the invention is that modulated threshold values allow error diffusion using only a three-weight error diffusion filter without compromising output image quality. This has the advantage of a nearly 25 percent reduction in error diffusion processing time over a four-weight filter.

The foregoing and other objects, features and advantages of the invention will become more readily apparent from the following detailed description of a preferred embodiment which proceeds with reference to the drawings.

The specification also includes Tables briefly described as follows:

TABLE 1 is a sequence of numbers having a blue noise frequency characteristic suitable for modulating halftoning threshold values according to the invention.

TABLE 2 is a lookup table of imposed matrix coefficients for selected gray values.

DETAILED DESCRIPTION OF THE PREFERRED EMBODIMENT

Introduction

Dithering generally falls within one of two broad classes—discrete (also called point) processes, and neighborhood processes. Point processes are those in which the output depends only on the current input pixel. Neighboring pixels are ignored.

An ordered dither algorithm generates a binary halftone image by comparing pixels from an original continuous-tone image (source data) to a threshold value from a predetermined threshold array. The thresholds are "ordered" rather than "random" i.e. for each gray level or tone x, the corresponding array is equal to the x-1 array plus one additional dot. Ordered dither is a point operation. Once a suitable threshold array is determined for a given output device, implementation of dithering is known.

Ordered dithering techniques can be further classified by the nature of the dots produced, i.e. dispersed or clustered. Generally, dispersed-dot ordered dither is preferred, but clustered-dot dither must be used for those binary display devices that cannot properly display isolated pixels. The commonly used commercial printing process uses clustered-dot halftones. A good reference for halftoning techniques is R. Ulichney, DIGITAL HALFTONING (The MIT Press, 1987).

Point processes, such as ordered dithering, have the advantages of simplicity and fast computation. However, the quality of a resulting image is inferior to an image created from the same source data and processed using a neighborhood dithering process such as error diffusion.

Error diffusion requires comparing each pixel, one at a time, against a predetermined threshold gray value. A dot is "fired" at a given pixel location if the corresponding source data gray value exceeds the threshold, and "not fired" otherwise. This process is called quantization. The difference between the source data gray value and the quantized value (which by definition is zero or one), called the quantization error, is "diffused" by spreading the error among several neighboring pixels. This may be done, for example, according to the now classic Floyd and Steinberg error diffusion filter, in which the error is spread among four neighboring pixels, albeit not evenly. See R. Floyd and L. Steinberg, "Adaptive algorithm for spatial grey scale," SID Int'l. Sym. Digest of Tech. Papers pp. 36-37 (1975).

Raster Order Processing

Figure 1:
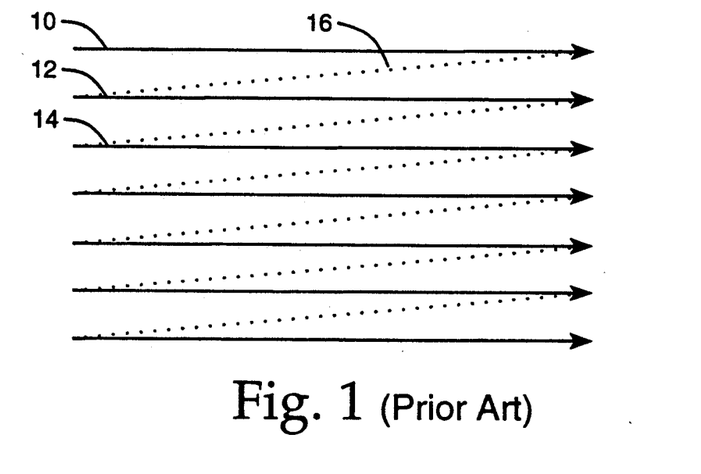
FIG. 1 illustrates a normal raster order of processing scan lines of image data.

Conventionally, digital image data is processed in raster order as illustrated in FIG. 1 of the drawings. Referring now to FIG. 1, each horizontal line, for example lines 10, 12, 14 represents a row of pixel data. In normal raster order the lines are processed from top to bottom, i.e., beginning with line 10, and each line is processed from left to right as indicated by the arrow heads. Thus line 10 is processed first, from left to right, and the next pixel to be processed after the right end of line 10 is that at the left end of line 12, and so on. This sequence is illustrated by the dotted lines, for example dotted line 16. As noted above, the normal raster processing order contributes to start-up delay anomalies.

Figure 2:
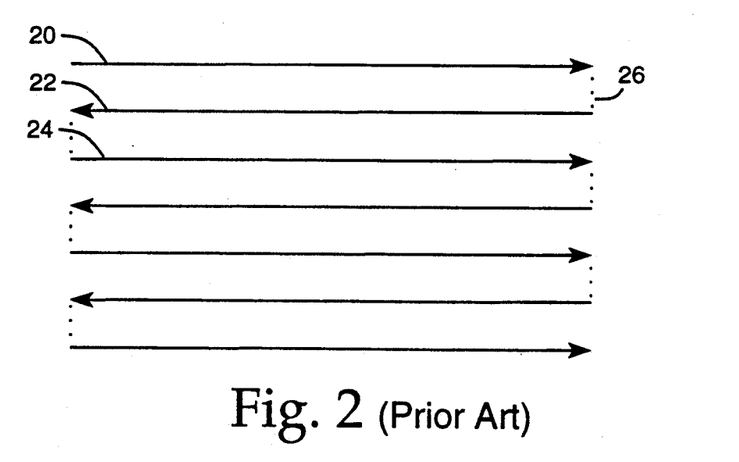
FIG. 2 illustrates a serpentine raster order of processing image data.

A serpentine or boustrophedonic processing order has been suggested in order to break up the patterns that result from the traditional order. A boustrophedonic processing order is illustrated in FIG. 2, in which each horizontal line, for example line 20, 22, 24 again represent a row of pixel data. Here, processing proceeds in row 20 from left to right, followed by row 22 from right to left, followed by row 24 from left to right and so on. The transition from one scan line to the next is illustrated by dotted line 26. This processing order, however, introduces its own pattern and anomalies which compromise output image quality.

Figure 3:
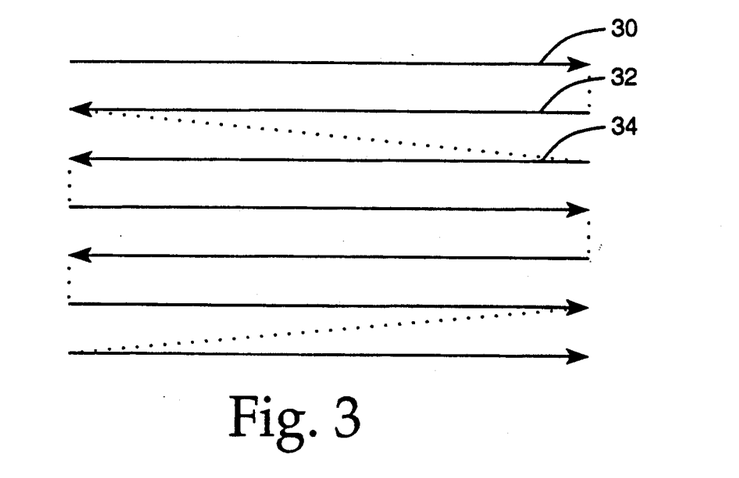
FIG. 3 illustrates a blue noise raster order of processing image data according to the present invention.

According to the present invention, the rows of digital image data are processed from top to bottom, as before. However, the direction of processing each row is selected in a random fashion, so as to avoid forming patterns that would be apparent in the rendered image. The direction of processing each scan line is selected according to a blue noise function, i.e., white noise subjected to high pass filter. Referring to FIG. 3, a first scan line 30 is processed from left to right, followed by a scan line 32 processed from right to left, followed by a third scan line 34 also processed from right to left, etc. as illustrated in the Figure. The directions change in a random blue noise fashion. However, the selection of a processing direction is further restricted such that no consecutive three scan lines are processed in the same direction. In other words, the selection function is filtered to have a cut-off or minimum frequency of one direction change per three scan lines.

An appropriate predetermined sequence of bits may be stored as a lookup table for selecting processing direction. For example, a sequence in which a zero represents left to right processing of a scan line and a one represents right to left processing, may be stored in memory in a computer system to provide the blue noise function for selecting the direction of processing each scan line of pixels. The lookup table may be of any convenient length, for example 512 or 1024 bits, which may be recycled. That is, for an "N" bit lookup table, where the image data comprises more than N scan lines, an address counter would roll-over or reset to the first address of the lookup table after each "N" scan lines and thus reuse the table.

Modulated Error Diffusion Threshold

Figures 4, 5A:
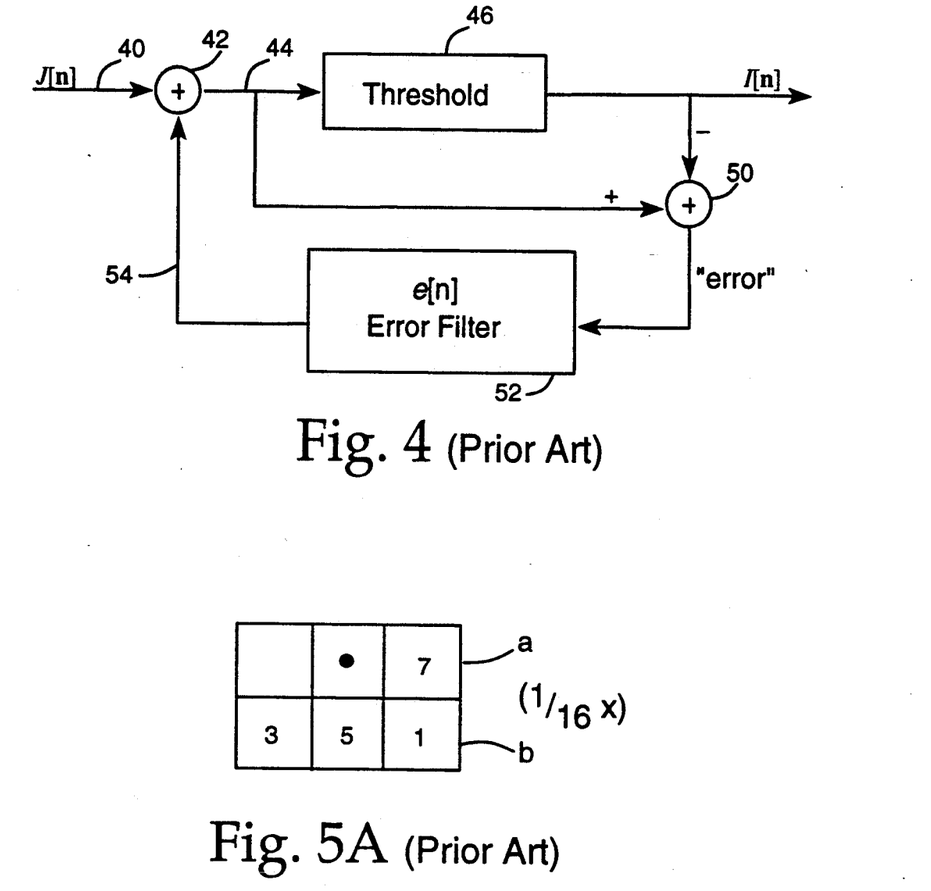
FIG. 4 illustrates a known error diffusion algorithm.
FIG. 5A illustrates the Floyd and Steinberg error diffusion filter.

This new methodology is best understood by first briefly reviewing known error diffusion techniques. A well-known error diffusion halftoning algorithm is illustrated by the diagram of FIG. 4. Digital image input data i.e., a continuous amplitude, discrete-space image $J[n]$ is input at node 40 to a summing junction 42. For each pixel, the gray value is input at node 44 to a threshold means 46 which compares that gray value to a predetermined threshold value, referred to as the error diffusion threshold. If the input value exceeds the threshold value, the output is a one, so that a dot will be fired at the corresponding location. The output bit is written to the corresponding location of a quantized discrete-space image $I[n]$.

The quantized quantity, zero or one, is subtracted from the input gray value at summing junction 50 to form an error term. For example, if the input gray value for a given pixel is one-fourth or 64/256, and the threshold value is 50% or 128/256, then the quantized value will be a zero and the error term will be 64/256−0=64/256. Fifty percent is a commonly used threshold value for error diffusion halftoning. In the example, since the pixel of interest has a gray value of 64 but no dot was fired (the quantized value is zero), there is a positive error to be "diffused" among surrounding pixels. The gray values of selected surrounding pixels are adjusted (increased in this example) so that the average gray value over a larger region of the output image will be faithful to the input image gray values.

The manner in which the error term is diffused is defined by an error filter. One commonly used error filter is the Floyd and Steinberg filter illustrated in FIG. 5A. As shown in the Figure, the error term for a given pixel, represented by the black dot, is diffused among four pixel locations adjacent to the current pixel. At each such neighboring pixel location, a weighted portion of the error term is added to the source image pixel gray value. To continue the above example, the error term 64/256 is input to the error filter means 52 and the resulting adjustments are provided over path 54 to summing junction 42 for adding them to corresponding pixels of input data. More specifically, according to the error filter of FIG. 5A, 7/16ths of the 64/256 error term is added to the adjacent pixel to the right of the current pixel, as indicated by pixel location "a" in FIG. 5A. One-sixteenth of the 64/256 error term, i.e., 4/256 is added to the source image gray value for the pixel location "b" of FIG. 5A, and so on, so that the error term is diffused among the four surrounding pixel locations according to the weights indicated in FIG. 5A. This particular error filter was shown by Floyd and Steinberg to be optimal in the context of the halftoning method they presented. Others filters have more terms, i.e. they diffuse the error term among a larger number of neighborhood pixels, unfortunately at great cost in terms of processing speed.

I have found that the start-up delay anomaly described above may be reduced or eliminated by substantially reducing the error diffusion threshold value and by determining the threshold value with blue noise, rather than using a constant value. This is called modulating the threshold value.

Modulating the error diffusion threshold may conveniently be implemented by storing a predetermined sequence of numbers having the requisite blue noise characteristics in a memory. During halftoning, each time a threshold value is needed, i.e., for each pixel of image data, a current value is read from the lookup table. The current pixel gray value is compared to this current threshold value for determining the error term as described above with respect to FIG. 4. Some may find it counter-intuitive to modulate the threshold value but, in fact, the threshold value is arbitrary. While a low, constant threshold value will reduce start-up delay for low gray values, it will unfortunately have the opposite effect for high gray values. In other words, resolution will be sacrificed for high gray values along boundaries or edges in the output image. I have found that significant improvements can be effected by modulating the threshold value with blue noise as described.

The object of halftoning, in general, is to optimize the appearance of the output image on a display terminal or printed sheet of paper. Optimization of halftoning alogorithms, therefore, generally requires consideration of the specific output or target device. In one example of the commercial embodiment, the invention is implemented in a ink jet printing system having for example a rectangular grid with 300 dots per inch resolution. Ink jet printing systems of this type may be monochrome or color, or both (CMYK). In view of the relatively large size of printed ink dots, and other characteristics of ink jet printing systems such as mechanical tolerances, pen alignment, etc. we have found improved printed quality by modulating the error diffusion threshold values according to the values shown in the following table.

TABLE 1

| Blue Noise Error Diffusion Threshold Values |
| --- |
| 32,44,19,45,28,40,23,48,48,35,40,45,31,29,36,42,35,23,42,49,42,39,19,42,31,50,38, |
| 49,29,39,46,21,28,45,36,29,24,37,20,22,45,31,30,36,49,40,29,45,42,21,24,49,40,46, |
| 19,41,29,46,37,35,34,40,47,46,21,33,42,28,35,22,49,20,22,39,39,30,33,38,21,50,32, |
| 49,47,46,25,32,44,45,26,23,48,39,35,44,24,20,35,30,30,42,36,33,40,41,20,27,44,43, |
| 32,28,25,44,31,49,20,21,46,42,29,40,44,31,37,40,36,33,27,50,45,29,50,29,48,39,28, |
| 37,39,28,46,49,34,42,31,20,41,48,25,21,22,38,37,34,43,41,20,36,31,44,44,29,32,47, |
| 50,48,26,26,48,34,31,40,37,22,23,46,34,28,32,47,43,22,38,49,28,39,22,19,42,20,23, |
| 26,42,20,37,33,20,45,49,21,22,36,21,30,37,20,50,23,40,40,43,41,19,26,49,24,42,23, |

TABLE 1-continued
Blue Noise Error Diffusion Threshold Values 32,39,20,19,42,36,33,29,48,27,38,37,27,30,37,46,34,49,33,28,46,39,19,40,40,27,47,
42,20,23,45,22,46,29,21,38,33,46,33,43,36,37,42,24,23,49,24,32,44,45,28,37,44,46,
38,21,23,50,37,31,46,31,29,42,44,19,38,44,23,49,40,19,31,38,35,22,36,46,33,20,40,
21,50,31,40,29,29,42,32,31,49,46,23,22,39,42,21,47,34,24,43,23,33,42,34,49,30,47,
35,46,41,28,43,40,21,49,34,30,49,47,28,50,27,50,24,19,21,45,36,30,28,37,43,20,34,
25,37,25,43,20,33,45,35,30,19,38,24,41,24,48,23,49,30,27,36,45,26,22,30,47,19,44,
38,31,40,33,29,46,31,38,23,48,46,19,49,37,45,30,49,22,27,43,38,43,47,22,41,21,26,
21,42,42,33,43,30,48,43,32,35,48,44,31,41,30,35,36,37,30,49,32,22,40,29,28,48,43,
27,22,46,25,24,71,23,40,21,28,40,23,44,35,28,41,20,40,37,37,27,36,37,20,23,28,33,
39,20,23,44,19,37,48,27,50,39,21,38,19,42,19,42,19,48,43,19,44,35,44,21,47,22,45,
21,30,38,32,39,31,30,19,42,49,33,24,42,43,22,39,48,39,45,34,22,39,46,31,39,26,25,
46,22,23,50,24,33,44,19,44,35,45,47,30,44,31,44,47,31,34,36,23,41,36,33,22,20,37,
23,50,21,42,40,21,36,48,31,37,19,26,43,41,32,47,32,23,47,31,21,38,39,23,30,47,28,
25,42,47,26,26,45,24,27,49,48,27,27,49,24,31,45,30,45,48,20,25,39,34,30,47,22,42,
23,29,47,30,42,25,49,48,50,21,29,45,26,32,41,44,33,46,29,39,30,38,29,45,32,36,47,
21,36,25,20,48,34,23,43,40,31,33,40,42,23,31,22,27,39,22,30,45,46,19,47,25,36,33,
37,31,50,30,35,44,31,50,22,35,36,45,24,45,48,26,19,27,44,28,21,38,36,23,45,36,41,
28,30,40,45,29,46,24,37,42,31,22,47,40,23,37,29,44,28,39,49,34,45,24,22,41,46,48,
24,27,47,20,23,50,30,30,45,25,44,27,40,22,41,28,49,30,32,49,24,47,23,38,39,23,26,
41,19,40,19,42,42,21,42,49,19,20,23,47,19,48,26,47,47,24,42,29,32,48,47,33,38,39,
29,28,27,46,44,34,49,44,19,32,45,32,21,42,33,31,36,23,34,42,33,38,20,35,34,45,47,
24,41,50,32,45,28,43,27,49,36,22,25,46,50,45,25,50,26,31,41,50,22,49,22,25,26,47,
31,46,42,19,34,44,43,48,43,35,34,43,32,35,47,42,35,46,31,48,28,35,50,26,47,31,28,
43,25,46,41,24,46,41,27,48,39,36,22,47,35,30,19,46,33,38,49,25,48,28,41,32,26,49,
48,35,45,30,36,41,40,45,31,36,22,21,42,30,35,46,20,31,46,47,38,50,36,37,22,21,46,
32,45,42,41,33,34,45,25,36,27,23,40,26,19,28,48,25,39,48,26,23,43,32,38,35,37,29,
46,22,39,29,47,24,41,27,36,21,40,42,33,47,48,24,41,27,24,36,35,23,50,34,29,39,26,
34,26,45,44,47,26,31,44,26,35,44,44,35,31,43,39,35,26,42,35,45,49,22,27,50,41,35,
37,36,23,45,34,21,40,34,37,39,26,39,28,23,48,34,31,50,19,48,33,50,45,35,42,22,29,
39,30,26,39,19,44,19,39,32,39,23,38,33,34,47,34,41,50,34,27,23,50,19,46,44, The above table consists of 1,024 entries and the sequence may be repeated every 1,024 pixels as needed. Other means for generating a blue noise function are known, for example, the blue noise function may be calculated using random number generators or white noise may be generated and then high-pass filtered so as to form the requisite blue noise using analog circuitry, followed by A/D conversion, etc. The specifics of which will be apparent to an engineer of ordinary skill in the art.

Error Diffusion Filter

Figure 5B:
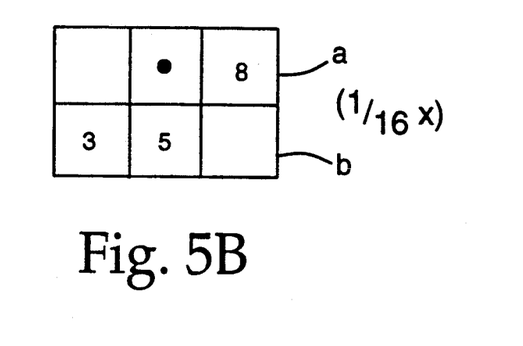
FIG. 5B illustrates a three-weight error diffusion filter according to the present invention.

Known error diffusion filters such as the Floyd and Steinberg filter described above have at least four weighted elements. I have found that modulating the error diffusion threshold as described above allows use of a simpler, three-weight filter without sacrificing output image quality. Referring now to FIG. 5B, the three-weight filter differs from the prior art in that the pixel "a" to the right of the current pixel has a weight of 8/16 and the pixel "b" below it is not used in this filter. The other two pixels are the same as the Floyd and Steinberg filter. The new filter has the advantage of reducing error diffusion processing time by nearly 25 percent.

Imposed Matrix Techniques

I have also found that improved output image quality, i.e., avoidance of unpleasant patterns and distracting anomalies, can be effected by slightly modifying the input or source image data prior to halftoning. The purpose here is to slightly alter the image data in ways that do not change the image gray values significantly, but which yield improved image quality after error diffusion. This technique is referred to as imposed matrix modification of the source data.

The first step is to design an imposed matrix for each anticipated gray value. For example, in a system with 256 gray levels of image data, 256 different imposed matrices should be determined. The actual number of matrices may be reduced in practice as will be described below. The general concept, however, is to design an individual matrix for each gray level, such that a source image, if modified according to the imposed matrices before error diffusion, will result in an improved quality output image after error diffusion.

Figure 6A:
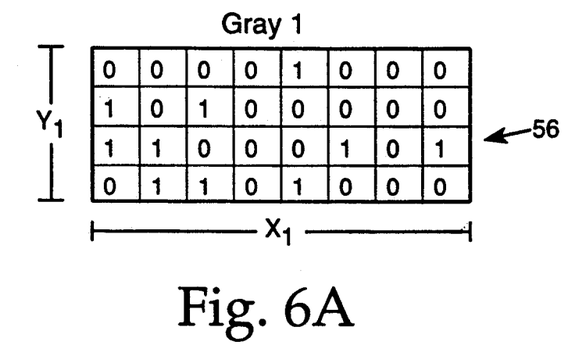
FIG. 6A is a first example of an imposed matrix bitmap.

Each imposed matrix consists of a predetermined array of cells, each cell having one of a pair of selected gray level values or coefficients. Referring to FIG. 6A, for example, the Figure shows a bitmap which defines the arrangement of cells for an imposed matrix here identified as Gray 1. The actual matrix is not merely a bitmap but a matrix in which one of the pair of coefficients is substituted for each zero in the bitmap, and the other coefficient is substituted for each one in the bitmap. The pattern or bitmap itself and the pair of values or coefficients, are selected so that each imposed matrix has, on average, the desired gray level.

Each of the imposed matrices is of arbitrary dimensions. In the preferred embodiment, these matrices are rectangular, although other grid geometries, for example hexagonal grids, could be used to implement the same principles. Since there is no restriction in this regard, each imposed matrix may be made larger or smaller, or its aspect ratio varied, so as to achieve optimal results after halftoning.

Figure 6B:
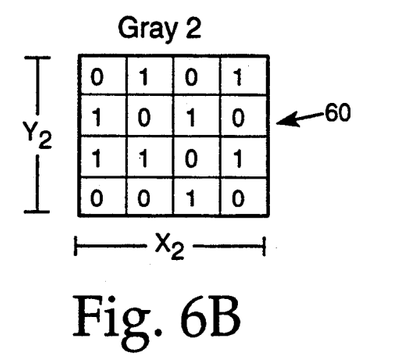
FIG. 6B is a second example of an imposed matrix bitmap.
Figure 6C:
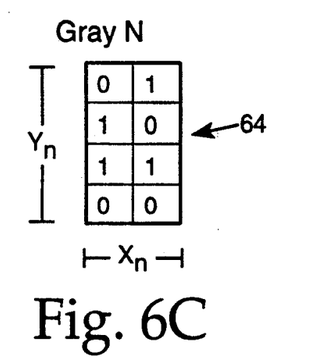
FIG. 6C is a third example of an imposed matrix bitmap.

Three examples of imposed matrix bitmaps (56, 60, 64) are illustrated in FIGS. 6A, 6B and 6C, respectively. It may be seen that each of these bitmaps has a different size and aspect ratio than the others. This is to be contrasted with, for example, ordered dither techniques in which all dither matrices are of the same dimensions and are strictly ordered. In fact, the present imposed matrix technique is not dithering at all. Recall that dithering involves comparing input gray values against threshold values for quantizing the pixels. The imposed matrix technique described here merely modifies the gray value of input data prior to dithering or error diffusion halftoning. It does not reduce the number of bits of data. It does have the advantages of improved output image quality and it allows use of a smaller error diffusion filter, described below.

To completely define a set of imposed matrices requires selecting the pair of coefficients for each matrix. These may be conveniently stored in the form of a lookup table. Such a table would have a series of source image gray values to be used as addresses or indexes into the table, and a pair of coefficients for each gray level. It is not essential that a unique bitmap be designed for each imposed matrix. For a given target output device, it may be found that a particular matrix bitmap is suitable for a number of different gray levels.

Figure 7:
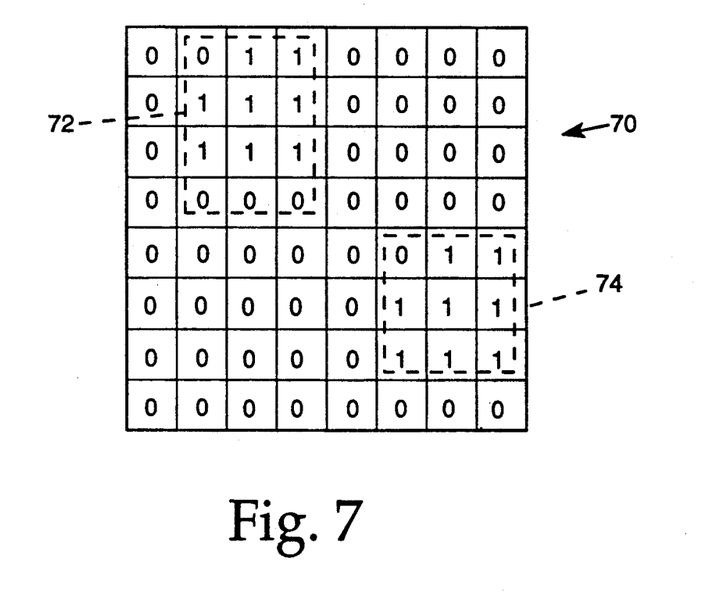
FIG. 7 shows a 16/64 imposed matrix bitmap.

In one example of a commercial embodiment of the invention, namely an ink jet printing system, a single gray value bitmap is used for all 256 gray levels. This preferred bitmap is shown in FIG. 7, as bitmap 70. It may be observed that bitmap 70 includes a first cluster 72 in the upper left quadrant and a second cluster 74 in the lower right quadrant. While this particular bitmap is 8 bits by 8 bits, the dimensions may be selected arbitrarily, as noted. In the commercial embodiment, 256 gray values and the corresponding pair of coefficients for each value are stored in memory in a lookup table. The optical values for a given target output system must be determined experimentally, and will depend upon many factors such as the dot size, grid size, etc. Selected matrix coefficients from the ink jet example are shown in the following table.

TABLE 2

| | Imposed Matrix Coefficients | | | |
|---|---|---|---|---|
| Image Pixel | | | | Matrix |
| % Gray | Gray Value (× 1/256) | Coefficients 0-bit | Coefficients 1-bit | Average Gray Value |
| 1/8 | 32 | 32 | 34 | 32.5 |
| 1/4 | 64 | 60 | 78 | 64.5 |
| 3/8 | 96 | 96 | 98 | 96.5 |
| 1/2 | 128 | 124 | 142 | 128.5 |
| 5/8 | 160 | 160 | 160 | 160.0 |
| 3/4 | 192 | 192 | 192 | 192.0 |
| 7/8 | 224 | 224 | 224 | 224.0 |
| 100 | 256 | 256 | 256 | 256.0 |

The relative numbers of ones and zeros in a gray value matrix bitmap also is arbitrary. The only restriction is that, for a given pixel gray value, the gray value matrix that results after substitution of the two coefficients for the zeros and ones in the bitmap, respectively, must result in an average gray value approximately equal to the desired gray value.

Designing imposed matrices may be done in several ways. One procedure is to identify anomalies in an output image for a given gray value source image. Then create a mask that is opposite or complementary to those anomalies. In other words, design a bitmap by placing ones in locations where the output image can be improved by encouraging the firing of a dot and, conversely, placing a zero at locations where the output image can be improved by discouraging firing of a dot (this assumes of course that the smaller of the imposed matrix coefficients is assigned to zero bits.) These steps define a suitable bitmap for the imposed matrix of interest.

The next step is to select a pair of gray values or coefficients for the matrix. The selection of these values is completely unrestricted (within the range of values of a particular system), as long as the resulting matrix (when the selected values are substituted into the bitmap), has an average gray value equal to the source image gray value of interest, or at least approximately so. The relative sizes of the coefficients determines the extent to which they influence the halftoning process. To illustrate, consider the bitmap of FIG. 6B, in which there are equal number of zeros and ones (although this is not a requirement). If the selected coefficients are and three, they average to two, which would be appropriate for the pixel gray level equal to two. In that case, any pixel that is replaced with a three will be three times more likely to fire a dot than a pixel that is replaced with a one. This is because of error diffusion. In fact, for an input image that has a constant gray level of two, if the pixels are adjusted according to this imposed matrix, the gray level of two will never be error diffused. Rather, substituted values of one and three will be error diffused, still achieving an average gray value of two over the image.

If the selected coefficients are zero and four, they would also average to a value of two for the bitmap of FIG. 6B. The result in that case is that pixels that are replaced with a four will fire every time, whereas pixels replaced with a zero would never fire. In this extreme example, the influence of the imposed matrix technique is so strong as to essentially dictate the outcome after error diffusion. In practice, a more subtle approach is used, in which the coefficients are relatively close to one another, as may be seen in the examples of Table 2.

Another approach to design of the imposed matrices is to first create a desirable output image pattern, for example one having blue noise type characteristics that are pleasant to most observers. Then one would "reverse engineer" that pattern in order to identify an imposed matrix that would result in the desired pattern after error diffusion. This may be done experimentally by having a computer generate a large number of possible matrices, and subjectively examine the output to identify the most desireable of the matrices.

Figure 8:
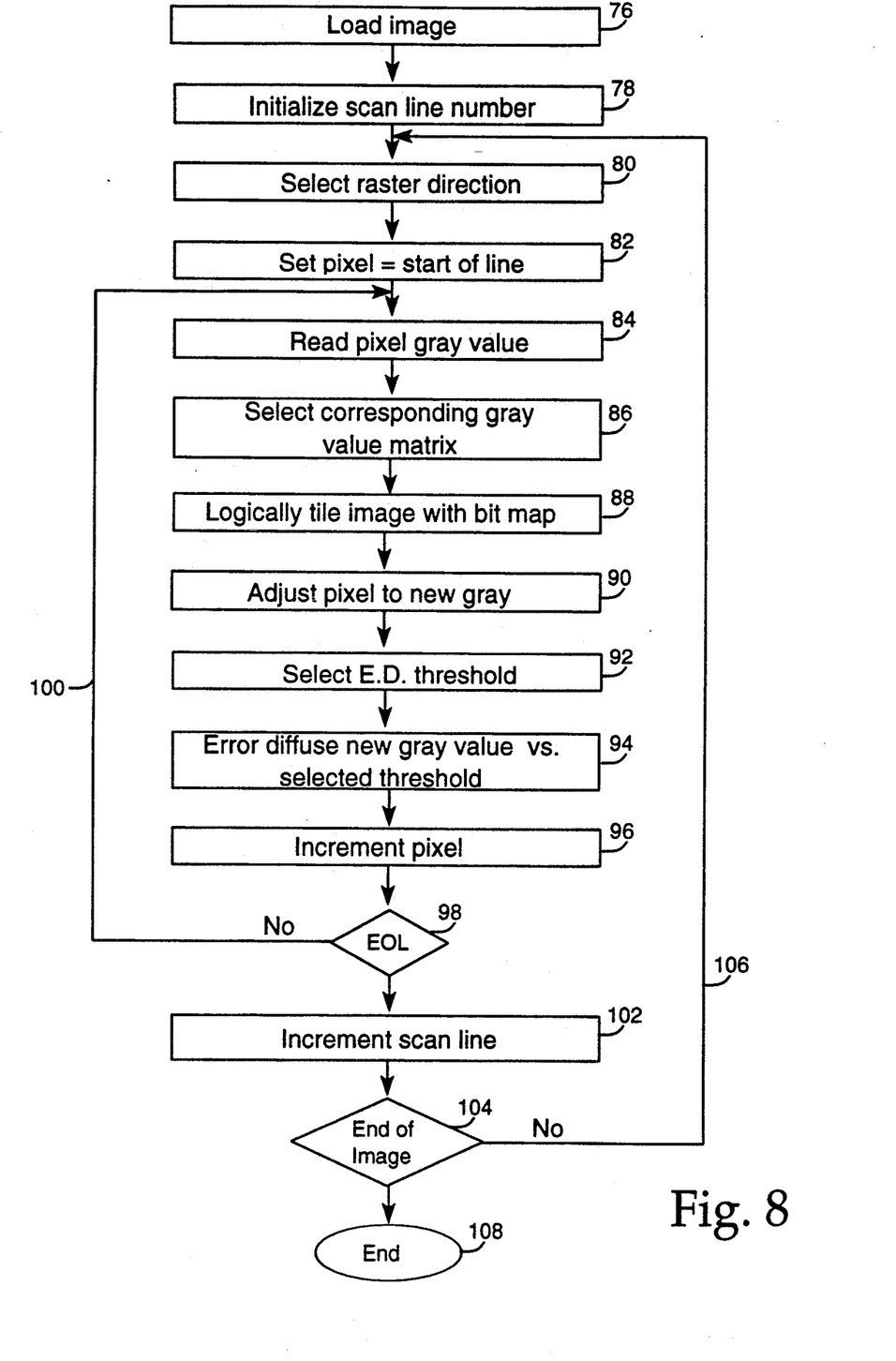
FIG. 8 is a flow chart illustrating a digital halftoning method according to the present invention.

Referring now to FIG. 8, a flow chart illustrates the halftoning method. First, a digital input or source image file is loaded 76 for processing. A scan line number is initialized 78 for processing the image scan lines sequentially. Next, an initial direction is selected 80 for processing the first scan line. The raster direction is selected with a blue noise function as described above. A pixel counter is set 82 to one end of the line, depending on the selected initial processing direction.

The first image pixel is read 84 to determine its gray value. Next an imposed matrix corresponding to that gray value is selected, step 86. The image is logically tiled with the selected matrix, step 88, which preferably is done indirectly by logically tiling the image with the selected gray value matrix bitmap, as the actual coefficient values can be substituted later. The tiling operation, which is conveniently carried out using modulo arithmetic, determines where the current pixel would appear in the selected imposed matrix if the source image were covered with a iterations of the selected matrix, beginning from the origin where processing starts and concatenated to each other in a regular rectangular array in a number sufficient to cover the source image up to and including the current pixel. Thus it can be determined whether the corresponding location in the selected matrix bitmap is a zero or a one. The corresponding coefficient or new gray level value is looked up 90 and the current pixel adjusted to that new gray value.

Next an error diffusion threshold is selected 92, using blue noise as described above. Error diffusion 94 proceeds, using the new gray value and quantizing it against the selected threshold value. The error term is diffused using the new three-weight filter described above with regard to FIG. 5B. Next the pixel address or counter is incremented (or decremented if the current processing direction is reverse), step 96, and end-of-line test 98 is conducted. If it is not the end of the current scan line 100, the next pixel is processed beginning at step 84 as described above.

After the current line is completely processed, the scan line address or counter is incremented 102, and end-of-image test 104 conducted. If additional lines remain to be processed, control flows back 106 to step 80 to select a processing direction for the next line, and so on until the image is completed 108.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A method of halftoning a digital image formed of a rectangular array of scan lines of pixels, each pixel having a gray value, for forming an output image, the method comprising the steps of:
   for each scan line of pixels selecting a corresponding processing direction such that the selected processing direction varies from each scan line to the next according to a blue noise function; and
   sequentially processing the scan lines of pixels, the individual pixels in each scan line being processed in the corresponding processing direction, whereby directional and start-up delay artifacts in the output image are reduced.

2. A method according to claim 1 wherein the blue noise function for selecting scan line processing direction has a minimum frequency of one direction change per three scan lines.

3. A method according to claim 1 further comprising storing a predetermined sequence of bits in a memory, each bit indicating by its state a scan line processing direction and the sequence of bits having frequency characteristics of the blue noise function, whereby said selecting step is implemented by sequentially reading the stored bits.

4. A method of halftoning a digital image defined by a rectangular array of scan lines of pixels, each pixel having a gray value, for forming an output image, the method comprising the steps of:
   for each possible gray value in the image, providing a corresponding imposed matrix, each imposed matrix having a respective average gray value approximately equal to the corresponding pixel gray value;
   for each image pixel,
      reading the image data to determine the pixel gray value;
      selecting an imposed matrix that corresponds to the pixel gray value;
      logically tiling the image with the selected imposed matrix to determine a location in the matrix that corresponds to the image pixel location; and
      adjusting the image pixel gray value to a corresponding new gray value defined by the corresponding location in the selected imposed matrix; and then
      error diffusing the pixel using the new gray value.

5. A method according to claim 4 wherein said error diffusing step includes selecting a modulated error diffusion threshold value and quantizing each pixel against the selected threshold value, the modulated threshold values varying from one pixel to the next according to a blue noise function having a predetermined average value.

6. A method according to claim 5 wherein the modulated threshold values are bounded between approximately five percent and twenty percent.

7. A method according to claim 5 wherein the modulated threshold values vary from one to the next with a minimum frequency such no three consecutive values are above or below the average value.

8. A method according to claim 5 wherein the average value is less than approximately twenty-five percent.

9. A method according to claim 5 wherein said error diffusing step includes applying a three-weight error diffusion filter.

10. A method according to claim 9 wherein the three-weight error diffusion filter is a modified Floyd and Steinberg type filter having weights 8-0-5-3 expressed in clockwise sequence from the origin.

11. A method according to claim 4 wherein the imposed matrices are of arbitrary dimensions and are not ordered.

12. A method according to claim 4 wherein said providing an imposed matrix includes, for each possible image pixel gray value:
    providing a predetermined pattern of cells defined by a corresponding bitmap; and
    selecting a pair of coefficients for substitution into the bitmap such that the matrix has an average gray value approximately equal to the image pixel gray value.

13. A method according to claim 12 further comprising, for each imposed matrix, arranging the pattern of cells and selecting the coefficients so as to minimize artifacts in an output image that results from error diffusion of an image that consists of the corresponding image pixel gray value.

14. A method according to claim 4 wherein providing the imposed matrices includes:
    providing a predetermined pattern of cells defined by a corresponding bitmap; and
    for at least one of said gray values, selecting a respective pair of coefficients such that, when the selected coefficients are substituted into the preferred bitmap, the imposed matrix has an average gray value equal to the corresponding image pixel gray value.

15. A method of halftoning a digital image formed of a rectangular array of scan lines of pixels, each pixel having a gray value, for forming an output image, the method comprising the steps of:
    for each scan line of pixels, selecting a corresponding processing direction such that the selected processing direction varies from each scan line to the next according to a blue noise function, the blue noise function having a predetermined minimum frequency of at least one direction change per three scan lines;
    for each possible gray value in the image, providing a corresponding imposed matrix, each matrix having a respective average gray value approximately equal to its respective image gray value; and
    for each image pixel, reading the image data to determine the pixel gray value;

selecting the imposed matrix that corresponds to the pixel gray value;

logically tiling the image with the selected imposed matrix to determine a location in the matrix that corresponds to the image pixel location;

adjusting each image pixel gray value so as to form a corresponding new gray value defined by the corresponding location in the selected imposed matrix; and then error diffusing the pixel.

16. A method according to claim 15 wherein said error diffusing step includes quantizing each pixel against a modulated error diffusion threshold value, the modulated threshold values varying from one pixel to the next according to a blue noise function having a predetermined average value.

17. A method according to claim 15 wherein said error diffusing step includes applying a three-weight error diffusion filter.

18. A method according to claim 15 wherein providing the imposed matrices includes providing a predetermined bitmap and, for at least one image gray value, selecting a pair of coefficients for substitution into the bitmap so as to form an imposed matrix having an average gray value approximately equal to the said image gray value.

19. A method according to claim 18 wherein the bitmap is a rectangular array.

20. A method according to claim 18 wherein the said bitmap is used for forming all of the imposed matrices, whereby each and every one of the matrices is defined by a respective pair of coefficients for substitution into the bitmap.

* * * * *